United States Patent
Murakami

(10) Patent No.: US 8,549,219 B1
(45) Date of Patent: Oct. 1, 2013

(54) PREVENTING HARD DRIVE FAILURE AND DATA LOSS DUE TO VIBRATION

(75) Inventor: Vance B. Murakami, Los Gatos, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 304 days.

(21) Appl. No.: 12/961,778

(22) Filed: Dec. 7, 2010

(51) Int. Cl.
  *G06F 12/16* (2006.01)
  *G06F 11/20* (2006.01)
(52) U.S. Cl.
  USPC ............. 711/112; 702/141; 711/113; 714/6.2
(58) Field of Classification Search
  None
  See application file for complete search history.

(56) References Cited

U.S. PATENT DOCUMENTS

| | | | |
|---|---|---|---|
| 7,302,534 B2 * | 11/2007 | Sinclair | 711/156 |
| 7,508,614 B1 * | 3/2009 | Sharma et al. | 360/73.03 |
| 2010/0268481 A1 * | 10/2010 | Lee | 702/34 |
| 2012/0112907 A1 * | 5/2012 | Flath | 340/540 |

* cited by examiner

*Primary Examiner* — Gary Portka

(57) ABSTRACT

A method to prevent data loss includes monitoring a vibration from a computer rack and, when the vibration is harmful to a hard disk drive in the computer rack, moving data in transition to the hard disk drive to another hard disk drive, spinning down the hard disk drive, and sending an alarm. The method further includes, after the vibration is no longer harmful to the hard disk drive, spinning up the hard disk drive, moving the data from the other hard disk drive to the hard disk drive, and clearing the alarm and adding an event to an alarm history.

20 Claims, 2 Drawing Sheets

PREVENTING HARD DRIVE FAILURE AND DATA LOSS DUE TO VIBRATION

FIELD OF INVENTION

This invention relates to a method for securing data by preventing hard driver failure to due to vibration.

DESCRIPTION OF RELATED ART

The performance of hard disk drives can be affected by mechanical vibration, such as those generated by cooling fans, adjacent hard disk drives, and other components with moving parts. While the read/write head positioning servos are designed to compensate for the effect of vibration, continuous vibration is known to degrade transfer rate and even cause unrecoverable damage to the data. Thus, what is needed is a method and system to prevent hard disk failure and data loss due to vibration.

SUMMARY

In one or more embodiment of the present disclosure, a method to prevent data loss includes monitoring a vibration from a computer rack and when the vibration is harmful to a hard disk drive in the computer rack, moving data in transition to the hard disk drive to another hard disk drive, spinning down the hard disk drive, and sending an alarm. The method further includes, after the vibration is no longer harmful to the hard disk drive, spinning up the hard disk drive, moving the data from the other hard disk drive to the hard disk drive, and clearing the alarm and adding an event to an alarm history.

BRIEF DESCRIPTION OF THE DRAWINGS

In the drawings.

Use of the same reference numbers in different figures indicates similar or identical elements.

DETAILED DESCRIPTION

Figure 1:
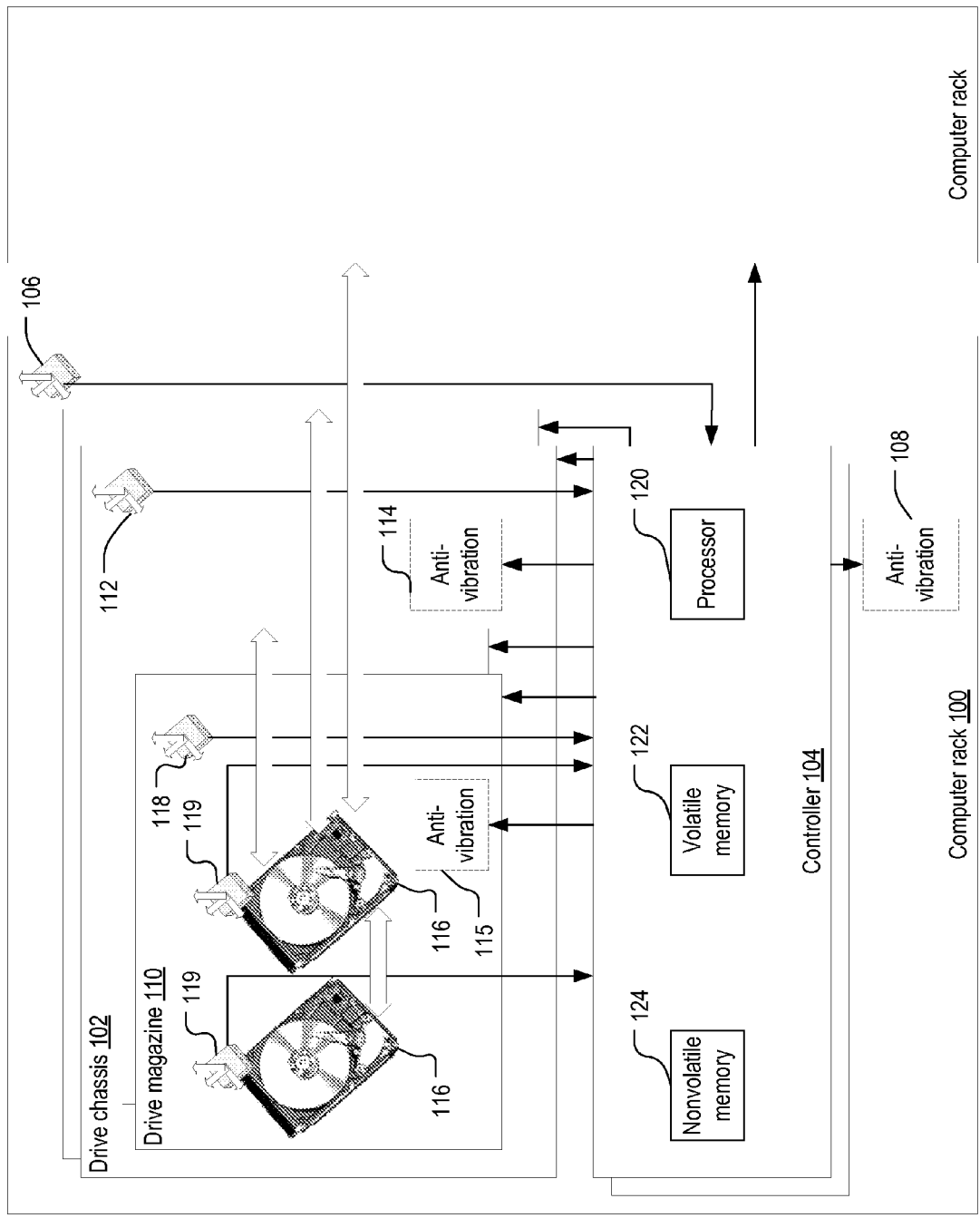
FIG. 1 is a block diagram of a computer rack in one or more embodiments of the present disclosure.

FIG. 1 is a block diagram of a computer rack 100 in one or more embodiments of the present disclosure. For example, computer rack 100 may house a utility storage system from 3PAR Inc. of Fremont, Calif. Computer rack 100 includes one or more drive chassis 102, one or more controllers 104, one or more accelerometers 106, and one or more optional anti-vibration devices 108. Each drive chassis 102 includes one or more drive magazines 110, one or more accelerometers 112, and one or more optional anti-vibration devices 114. Each drive magazine 110 includes one or more disk drives 116, one or more accelerometers 118, and one or more optional anti-vibration devices 115. Each hard disk drive 116 includes an accelerometer 119. The locations of accelerometers 106, 112, 118, and 119 are application specific but should generally be positioned at locations where the vibration will transfer through the system (e.g., stiff areas). In one or more embodiments, less than all of accelerometers 106, 112, 118, and 119 are present.

Each controller 104 includes a processor 120, system memory (volatile memory) 122, and hard disk or solid state drive (nonvolatile memory) 124. Processor 120 is coupled to accelerometers 106, 112, 118, and 119 to receive acceleration data. Executing a program stored on drive 124 and loaded into system memory 122, processor 120 performs a method to prevent hard drive failure and data loss due to vibration in computer rack 100. Specifically, processor 120 monitors for harmful vibrations at the accelerometer locations in computer rack 100. A vibration is harmful when its frequency causes unrecoverable damage to the data on the hard disk drive 116, such as causing a read/write head to crash down against a platter. Depending on its location, a vibration can affect a single hard disk drive 116 or multiple hard disk drives 116 on a drive magazine 110, a drive chassis 102, or the entire computer rack 100.

To prevent hard drive failure and data loss, processor 120 moves data in transition to an affected hard disk drive 116 to a backup hard disk drive 116 that is located on a different drive magazine 110, drive chassis 102, or computer rack 100. The location of the backup hard disk drive 116 is based on the location of the vibration. Processor 120 may first determine that the backup hard disk drive 116 is itself free of any harmful vibration. Processor 120 then spins down the affected hard disk drive 116 to prevent damage to data on the hard disk drive, and sends an alarm to a human administrator. Processor 120 may wait for the event to pass, as the vibration may be transitory. Alternatively, processor 120 may activate one or more of optional anti-vibration devices 108 and 114, such as electromagnetic, hydraulic, or mechanical damper or weight mechanisms, to change frequency of the vibration. When processor 120 determines the vibration is no longer harmful, it spins up the previously affected hard disk drive 116 and moves the data from the backup hard disk drive 116 to the previously affected hard disk drive 116.

Figure 2:
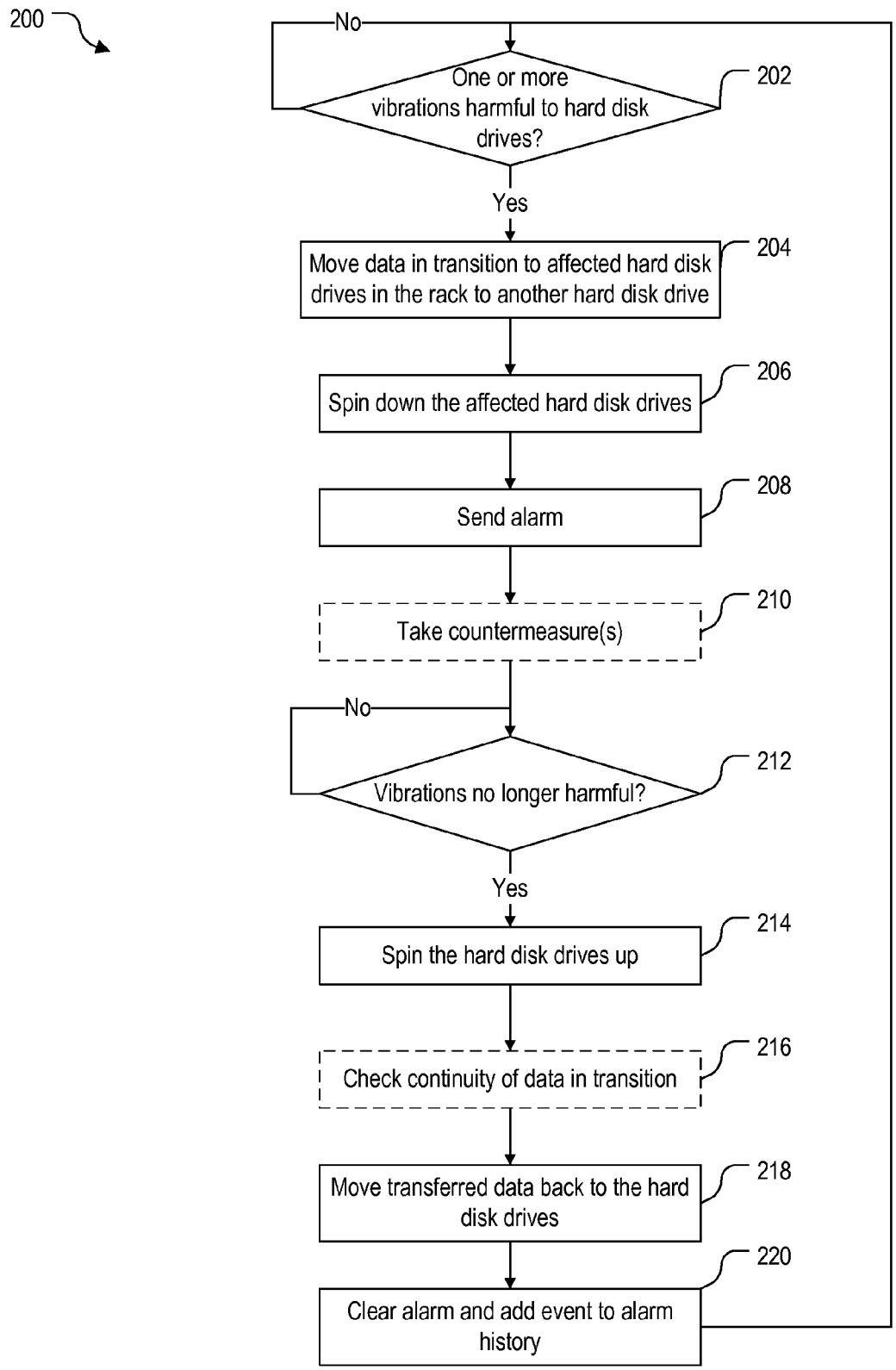
FIG. 2 is a flowchart of a method for preventing hard disk drive failure and data loss due to vibration in the computer rack of FIG. 1 in one or more embodiments of the present disclosure.

FIG. 2 is a flow chart of a method 200 for preventing hard disk drive failure and data loss due to vibration in computer rack 100 of FIG. 1 in one or more embodiments of the present disclosure. Although blocks of method 200 are illustrated in a sequential order, these blocks may also be performed in parallel, and/or in a different order than those described herein. Also, the various blocks may be combined into fewer blocks, divided into additional blocks, and/or eliminated based upon the desired implementation. Method 200 may begin in block 202.

In decision block 202, processor 120 monitors the vibrations from computer rack 100 and determines if any of them are harmful to one or more hard disk drives 116 in the computer rack. As described above, processor 120 is coupled to accelerometers 106, 112, 118, and 119 to receive vibration data. For each of accelerometers 106, 112, 118, and 119, testing may be done ahead of time to determine a safe range of vibrational frequencies for hard disk drives 116. Note that a safe range for one accelerometer may be different from a safe range for another accelerometer as a vibration at one location may eventually cause a harmful vibration at a different location. Processor 120 determines a vibration to be harmful when its frequency falls outside of its safe range for a predetermined period of time. When processor 120 determines one or more vibrations to be harmful, decision block 202 may be followed by block 204. Otherwise decision block 202 loops back to itself and processor 120 continues to monitor the vibrations from computer rack 100.

In block 204, processor 120 moves any data in transition to one or more hard disk drives 116 affected by the one or more harmful vibrations to one or more backup hard disk drives 116 that are free of any harmful vibration. Data in transition may be data cached or buffered at controllers 104 to be written to the affected hard disk drives 116. Data in transition may also be data cached or buffered locally in the affected hard disk drives 116. The data in transition may originate from controllers 104 or from host server computers.

Based on the location of the harmful vibration, processor 120 determines hard disk drives 116 affected by the vibration. Processor 120 may determine the affected hard disk drives 116 from any combination of the vibration data from accelerometers 106, 112, 118, and 119. In one exemplary scheme, harmful vibrations indicated by accelerometers 119 are directly correlated to the corresponding hard disk drives 116; a harmful vibration indicated by an accelerometer 118 at a drive magazine 110 is correlated to hard disk drives 116 on that drive magazine; a harmful vibration indicated by an accelerometer 112 at a drive chassis 102 is correlated to hard disk drives in that drive chassis; and a harmful vibration indicated by an accelerometer 106 at a compute rack 100 is correlated to hard disk drives in that computer rack. Block 204 may be followed by block 206.

In block 206, processor 120 spins down the affected hard disk drives 116. Spinning down a hard disk drive includes lowering the rotational speed of the platters and/or parking the read/write head of the hard disk drive. Block 206 may be followed by block 208.

In block 208, processor 120 sends an alarm. The alarm may be an audiovisual alarm or a text message to a human administrator. Block 208 may be followed by block 210.

In optional block 210, processor 120 takes a countermeasure against the harmful vibration in the computer rack 100. Processor 120 may activate one or more anti-vibration devices 108, 114, and 115 depending on the location of the harmful vibration. For example, processor 120 activates one or more anti-vibration devices 108 when the harmful vibration is detected by accelerometer 106 at the computer rack level, and processor 120 activates one or more anti-vibration devices 114 when the harmful vibration is detected by accelerometer 112 at the drive chassis level, and processor 120 activities one or more anti-vibration devices 115 when the harmful vibration is detected by accelerometer 118 at the drive magazine level. Optional block 210 may be followed by block 212.

In decision block 212, processor 120 determines if one or more vibrations are no longer harmful. Processor 120 determines a vibrational frequency to be no longer harmful when it returns within the normal range for a predetermined period of time. When a vibrational frequency returns to the normal range for the predetermined period of time, decision block 212 may be followed by block 214. Otherwise decision block 212 loops back to itself and processor 120 continues to monitor the vibrational frequency.

In block 214, processor 120 spins up the previously affected hard disk drives 116. Spinning up a hard disk drive includes increasing the rotational speed of the platters and/or unparking of the read/write head of the hard disk drive. Block 214 may be followed by block 216.

In optional block 216, processor 120 checks for continuity of the data that was written to the backup hard disk drives 116 in block 204. Processor 120 may check for continuity by comparing the data to another available copy of the data. The other available copy may be mirrored data kept in another hard disk drive 116 in a RAID 1 scheme or data, either application or parity, generated from other hard disk drives 116 in another RAID scheme. Alternatively, processor 120 may check for continuity of the data by performing a parity check calculated for data in transit to a hard disk drive 116. Optional block 216 may be followed by block 218.

In block 218, processor 120 moves the data that was written to the backup hard disk drives 116 to the previously affected hard disk drives 116. Block 218 may be followed by block 220.

In block 220, processor 120 clears the alarm and adds an event to the alarm history. The event may record the acceleration data for debugging the vibrational issues at a later time. Block 220 may loop back to block 202 to repeat method 200.

Various other adaptations and combinations of features of the embodiments disclosed are within the scope of the present disclosure. Numerous embodiments are encompassed by the following claims.

What is claimed is:

1. A method to prevent data loss, comprising:
monitoring a vibration from a computer rack;
when the vibration is harmful to a first hard disk drive in the computer rack:
moving data in transition to the first hard disk drive to a second hard disk drive distinct from the first hard disk drive, wherein the data is in transition to the first hard disk drive when the data is queued in a cache memory to be flushed to the first hard disk drive;
spinning down the first hard disk drive; and
sending an alarm; and
after the vibration is no longer harmful to the first hard disk drive:
spinning up the first hard disk drive;
moving the data from the second hard disk drive to the first hard disk drive; and
clearing the alarm and adding an event to an alarm history.

2. The method of claim 1, wherein the vibration is harmful to the first hard disk drive when a frequency of the vibration is outside of a safe range.

3. The method of claim 1, wherein the cache memory is a volatile memory of a controller of the first hard disk drive in the computer rack.

4. The method of claim 1, further comprising checking the continuity of the data prior to moving the data from the second hard disk drive to the first hard disk drive.

5. The method of claim 4, wherein checking the continuity of the data comprises comparing the data with another copy of the data stored elsewhere.

6. The method of claim 4, wherein checking the continuity of the data comprises performing a parity check.

7. The method of claim 1, further comprising, when the vibration is harmful to the first hard disk drive:
determining a location of the vibration; and
selecting the second hard disk drive based on the location of the vibration.

8. The method of claim 7, wherein the first hard disk drive and the second hard disk drive are located on a same drive magazine when the vibration is from the first hard disk drive.

9. The method of claim 7, wherein the first hard disk drive and the second hard disk drive are located on different hard disk magazines when the vibration is from the first hard disk drive's hard disk magazine.

10. The method of claim 7, wherein the first hard disk drive and the second hard disk drive are located on different drive chassis when the vibration is from the first hard disk drive's drive chassis.

11. The method of claim 7, wherein the first hard disk drive and the second hard disk drive are located on different compute racks when the vibration is from the computer rack.

12. The method of claim 1, further comprising, when the vibration is harmful to the hard disk drive:
  determining a location of the vibration; and
  activating an anti-vibration device based on the location.

13. The method of claim 1, wherein said monitoring a vibration comprises receiving acceleration data from one or more accelerometers.

14. The method of claim 13, wherein said adding the event to the alarm history includes saving the accelerometer data.

15. A data storage system, comprising:
  a computer rack;
  a first accelerometer on the rack;
  a drive chassis in the rack;
  a second accelerometer on the drive chassis;
  a drive magazine on the drive chassis;
  a third accelerometer on the drive magazine;
  a first hard disk drive on the drive magazine;
  a fourth accelerometer on the first hard disk drive; and
  a controller for the first hard disk drive, comprising:
    a processor; and
    a non-transitory, processor-readable storage medium encoded with an executable program comprising instructions for:
      monitoring vibrations from the first, the second, the third, and the fourth accelerometers;
      when one of the vibrations is harmful to the first hard disk drive:
        moving data in transition to the first hard disk drive to a second hard disk drive distinct from the first hard disk drive, wherein the data is in transition to the first hard disk drive when the data is queued in a cache memory to be flushed to the first hard disk drive;
        spinning down the first hard disk drive; and
        sending an alarm; and
      after the vibration is no longer harmful to the first hard disk drive:
        spinning up the first hard disk drive;
        moving the data from the second hard disk drive to the first hard disk drive; and
        clearing the alarm and adding an event to an alarm history.

16. The data storage system of claim 15, wherein the cache memory is a volatile cache memory of a controller of the first hard disk drive.

17. The data storage system of claim 15, wherein the instructions further comprise checking the continuity of the data prior to moving the data from the second hard disk drive to the first hard disk drive.

18. The data storage system of claim 15, wherein the instructions further comprise, when the vibration is harmful to the first hard disk drive:
  determining a location of the vibration; and
  selecting the second hard disk drive based on the location of the vibration.

19. The data storage system of claim 15, further comprising anti-vibration devices, wherein the instructions further comprise, when the vibration is harmful to the first hard disk drive:
  determining a location of the vibration; and
  activating one of the anti-vibration devices based on the location.

20. The data storage system of claim 15, wherein said adding the event to the alarm history includes saving the accelerometer data.

* * * * *

UNITED STATES PATENT AND TRADEMARK OFFICE
CERTIFICATE OF CORRECTION

PATENT NO. : 8,549,219 B1  
APPLICATION NO. : 12/961778  
DATED : October 1, 2013  
INVENTOR(S) : Vance B. Murakami Page 1 of 1

It is certified that error appears in the above-identified patent and that said Letters Patent is hereby corrected as shown below:

In the Claims:

In column 4, lines 66-67, in Claim 11, delete "compute" and insert -- computer --, therefor.

Signed and Sealed this
Thirty-first Day of December, 2013

Margaret A. Focarino
*Commissioner for Patents of the United States Patent and Trademark Office*